(12) United States Patent
Velthuis et al.

(10) Patent No.: US 9,602,660 B2
(45) Date of Patent: Mar. 21, 2017

(54) SYSTEM AND METHOD FOR HANDLING MOBILE MESSAGES WITH EMBEDDED URLS

(71) Applicant: Buc Mobile, Inc., Vienna, VA (US)

(72) Inventors: Adrian Carlton Velthuis, Crownsville, MD (US); Ipai Terry Hsiao, McLean, VA (US); Kirk Tsai, Potomac, MD (US); Michael Leonard Sullivan, Aldie, VA (US)

(73) Assignee: Buc Mobile, Inc., Vienna, VA (US)

( * ) Notice: Subject to any disclaimer, the term of this patent is extended or adjusted under 35 U.S.C. 154(b) by 0 days.

(21) Appl. No.: 14/446,206

(22) Filed: Jul. 29, 2014

(65) Prior Publication Data
US 2016/0036971 A1    Feb. 4, 2016

(51) Int. Cl.
*H04M 3/42* (2006.01)
*H04L 12/24* (2006.01)
*H04L 12/58* (2006.01)

(52) U.S. Cl.
CPC ........ *H04M 3/42382* (2013.01); *H04L 51/12* (2013.01); *H04L 51/08* (2013.01)

(58) Field of Classification Search
CPC .... H04M 3/42382; H04L 51/12; H04L 51/08; H04L 41/0293
USPC .............. 455/466, 412.1; 726/4, 15, 22, 23; 370/466
See application file for complete search history.

(56) References Cited

U.S. PATENT DOCUMENTS

| | | | | |
|---|---|---|---|---|
| 7,516,488 B1 * | 4/2009 | Kienzle | ................. | H04L 12/585 726/22 |
| 8,543,675 B1 * | 9/2013 | Yiu | ....................... | G06F 3/0484 709/223 |
| 2003/0208472 A1 * | 11/2003 | Pham | ................ | G06F 17/30876 |

(Continued)

*Primary Examiner* — Nathan Taylor
(74) *Attorney, Agent, or Firm* — Toering Patents PLLC (57) ABSTRACT

A system and method for handling mobile or text messages that include an original uniform resource locator ("URL") replace the original uniform resource locator ("URL") included in a body of the mobile message with a new replacement URL. Mobile messages may be sent to a mobile subscriber from a variety of sources, including other mobile subscribers both in and out of a carrier network, or from sources (e.g., a computer, etc.) outside of the carrier network. According to various implementations of the invention, when the mobile message is received by the carrier network (e.g., at a gateway to the carrier network or within the carrier network itself) the mobile message is scanned for a URL. If a URL is included in the mobile message, a replacement URL is generated and the original URL from the mobile message is replaced with the replacement URL. The original URL is stored and associated with the replacement URL for subsequent access and retrieval. The mobile message with the replacement URL is forwarded to the mobile subscriber. According to various implementations of the invention, when the mobile subscriber selects the replacement URL, the replacement URL directs the mobile device to content (e.g., a web page) notifying the mobile subscriber that content associated with the original URL is outside of the carrier network and providing a series of actions that the mobile subscriber may take.

17 Claims, 4 Drawing Sheets

(56) References Cited

U.S. PATENT DOCUMENTS

| | | | | |
|---|---|---|---|---|
| 2005/0015626 A1* | 1/2005 | Chasin | H04L 63/0245 | 726/4 |
| 2006/0092970 A1* | 5/2006 | Song | H04L 12/581 | 370/466 |
| 2007/0136136 A1* | 6/2007 | Nossik | G06Q 30/02 | 705/14.66 |
| 2007/0136806 A1* | 6/2007 | Berman | G06Q 10/107 | 726/22 |
| 2008/0034417 A1* | 2/2008 | He | H04L 67/02 | 726/15 |
| 2008/0291899 A1* | 11/2008 | Gromoll | G06F 17/30864 | 370/352 |
| 2010/0240448 A1* | 9/2010 | Keenan | G07F 17/32 | 463/27 |
| 2010/0306845 A1* | 12/2010 | Vaithilingam | G06Q 10/107 | 726/23 |
| 2011/0201314 A1* | 8/2011 | Marsico | H04L 51/063 | 455/412.1 |
| 2011/0213657 A1* | 9/2011 | O'Malley | G06Q 30/0251 | 705/14.49 |
| 2011/0264992 A1* | 10/2011 | Vishria | G06F 17/30887 | 715/208 |

* cited by examiner

SYSTEM AND METHOD FOR HANDLING MOBILE MESSAGES WITH EMBEDDED URLS

FIELD OF THE INVENTION

The invention is generally related to various messaging services for sending and receiving mobile messages via mobile device(s), and more particularly to handling mobile messages having embedded uniform resource locators ("URLs") to unwanted, inappropriate or malicious content.

BACKGROUND OF THE INVENTION

Various messaging services are available for sending mobile messages via mobile devices. Such messaging services include, but are not limited to, a Short Message Service ("SMS"), multimedia messaging service ("MMS"), instant messenger ("IM"), chat applications including anonymous chat applications, social network posts/messages (e.g., facebook, twitter, etc.). Each of these messaging services delivers mobile messages (e.g., text messages) to mobile devices, often over a wireless network. Mobile messages (an example of which is a text message and useful for discussion purposes) are often originated on a mobile device by an individual user, and transmitted over one or more carrier networks to be delivered to one or more other mobile devices. Text messages may also be originated outside of the wireless carrier network and submitted into the wireless carrier network via the Internet or other communication channel. In addition to personal communications between mobile device users, text messages may be delivered to mobile devices for many other reasons, including, but not limited to, account notifications, advertising, or delivery of a link to install a mobile device application, for example.

Like other communication channels, users of text messages (or other mobile messages) are often susceptible to unwanted or unsolicited text messages, commonly referred to as "spam." Some of these text messages may include a URL that links to a website or other content (mobile applications, mobile or other content, etc.). Originators of such text messages (also referred to as "spammers") send text messages including embedded URL's, hoping that a recipient of the text message (e.g., mobile device user) will take some action, such as, but not limited to, downloading a mobile application.

Delivery of text messages relies on a commonly known numbering plan for device addressing. Originators of spam, (i.e., "spammers") can address messages to reach mobile devices based on this numbering plan without knowing a specific address of any given mobile device. Wireless carriers grant access for message delivery from an originating address (e.g., SIM card number, mobile device number, device address, IP address, email address, username, user account, or other originating address) to a connection point into their carrier networks through various mechanisms as would be appreciated. In some cases, the originating address and the connection point may be one in the same. Due to the large numbers of connection points into a carrier network, identifying the source of unwanted text messages can be difficult.

Several conventional methods for detecting unwanted messages are in place today. These techniques generally look for patterns in message construction and similarities in messages originating from the same originating address or the same connection point. Once unwanted messages are detected, these techniques typically attempt to block future messages from that originating address or that connection point. Sometimes, this approach generates unintended results. First, the messages may not be unwanted messages. Second, only some, but not all, messages may be unwanted messsages. Third, because originating addresses and/or connection points to a wireless network are plentiful, spammers are readily able to switch to new or different connection point(s) and/or originating address(es) to thwart these efforts.

Other conventional methods permit mobile subscribers (i.e., end users, mobile device users, etc.) to report unwanted messages by, for example, forwarding the unwanted message to a specific address for reporting spam. Such techniques are suboptimal because they require the mobile subscriber to know in advance how to report spam. Further, by forwarding the unwanted message, the originating address and/or the connection point of the unwanted message may be lost.

What is needed is an improved system and method for handling mobile messages with embedded URLs, in particular, those URLs that link to unwanted, inappropriate or potentially malicious content.

SUMMARY OF THE INVENTION

Various implementations of the invention relate to systems and methods for handling text or other mobile messages with embedded URLs that link to unwanted, inappropriate and/or malicious content (i.e., "spam") and, in some cases, preventing further delivery of such text messages. Some implementations of the invention relate to systems and method for warning mobile subscribers of the risks from accessing unknown URLs embedded in text messages. Various implementations of the invention replace a URL embedded, or otherwise included, in a body of the text message with a new replacement URL. As would be appreciated, text messages may be sent to a mobile subscriber from a variety of sources, including other mobile subscribers both in and out of a carrier network, or from sources (e.g., a computer, etc.) outside of the carrier network. According to various implementations of the invention, when the text message is received by the carrier network (e.g., at a gateway or other connection point to the carrier network or within the carrier network itself) the text message is scanned for a URL. If a URL is included in the text message, a replacement URL is generated and replaces the original URL in the text message. Typically, the replacement URL is equal to or shorter in length than the original URL. The original URL is stored and associated with the replacement URL for subsequent access and retrieval. The text message with the replacement URL is subsequently forwarded to the mobile subscriber.

According to various implementations of the invention, when the mobile subscriber selects the replacement URL, the replacement URL is resolved and directs the mobile device to content (e.g., a web page or other content) notifying the mobile subscriber that the web page for the original URL is outside of the carrier network. In some implementations of the invention, this content may advise or otherwise notify the mobile subscriber of potential dangers in accessing the original URL. In some implementations of the invention, this content provides a series of actions that the mobile subscriber may take. Such actions may include, but are not limited to: visit the location of the original URL; cancel the redirection; report the text message as spam, etc. In some implementations of the invention, the replacement URL may merely redirect the mobile device to the location of the original URL and log the event. In some implementations of the invention, the web page may provide the mobile subscriber with a preview of the actual page to be visited when the original URL is followed.

Various implementations of the invention thus enlist support of mobile subscribers (i.e., recipients of text messages with embedded URLs) to determine whether certain text messages are truly unwanted.

Various implementations of the invention may be used to establish a trusted or branded "clearinghouse" URL to increase confidence of mobile subscribers while using text messages.

Various implementations of the invention may provide mobile subscribers with education concerning risks from selecting (e.g., following) URLs embedded in text messages. Various implementations of the invention may provide an actionable mechanism to immediately report spam without having to take additional affirmative steps to do so.

Various implementations of the invention may provide mobile subscribers with a touch point to validate age requirements before allowing the user to access certain content. Various implementations of the inventions may further provide an ability for mobile device subscribers (typically parents) to limit or control the delivery of text messages with embedded URLs to certain mobile device users (typically children) to prevent access to unwanted, inappropriate, or malicious content.

Various implementations of the invention may provide an ability to capture an originating source (e.g., an originating address or connection point) associated with a text message with an embedded URL (whether wanted or unwanted) and store it for future analysis. Various implementations of the invention may further provide an ability to identify a source of the text message independent of the originating source by examining an owner of the original URL embedded in the text message, by examining the URL that is ultimately resolved (e.g., within a browser or otherwise), and/or by examining a service or offering located at that URL (e.g. an application available for download).

Various implementations of the invention provide analytic data on behavior of mobile subscribers for wireless carriers to make better decisions whether certain text messages are truly unwanted. For example, a percentage of mobile subscribers who click on the replacement URL to access the content at the original URL, or a percentage of mobile subscribers who click through a warning message to reach the original URL may be an important measure of whether the text messages are truly unwanted, independent of whether mobile subscribers report the text messages as unwanted.

Various implementations of the invention may provide the carrier with analytic data from behavior of mobile subscribers when the mobile device is accessing the Internet via wifi rather than the carrier's proprietary wireless network.

Various implementations of the invention may create content (e.g., a web page, etc.) accessed via the replacement URL, where the content displays advertising as a revenue generating mechanism. Such implementations of the invention may also provide wireless carriers with an additional revenue stream. In some implementations of the invention, wireless carriers may implement a per click charging scheme to the originators of text messages which include URLs.

Various implementations of the invention may reimburse mobile subscribers for charges for unwanted text messages. Various implementations of the invention may configure lists of originating sources and/or their owners for wholesale blocking of text messages.

These implementations, their features and other aspects of the invention are described in further detail below.

DETAILED DESCRIPTION

Figure 1:
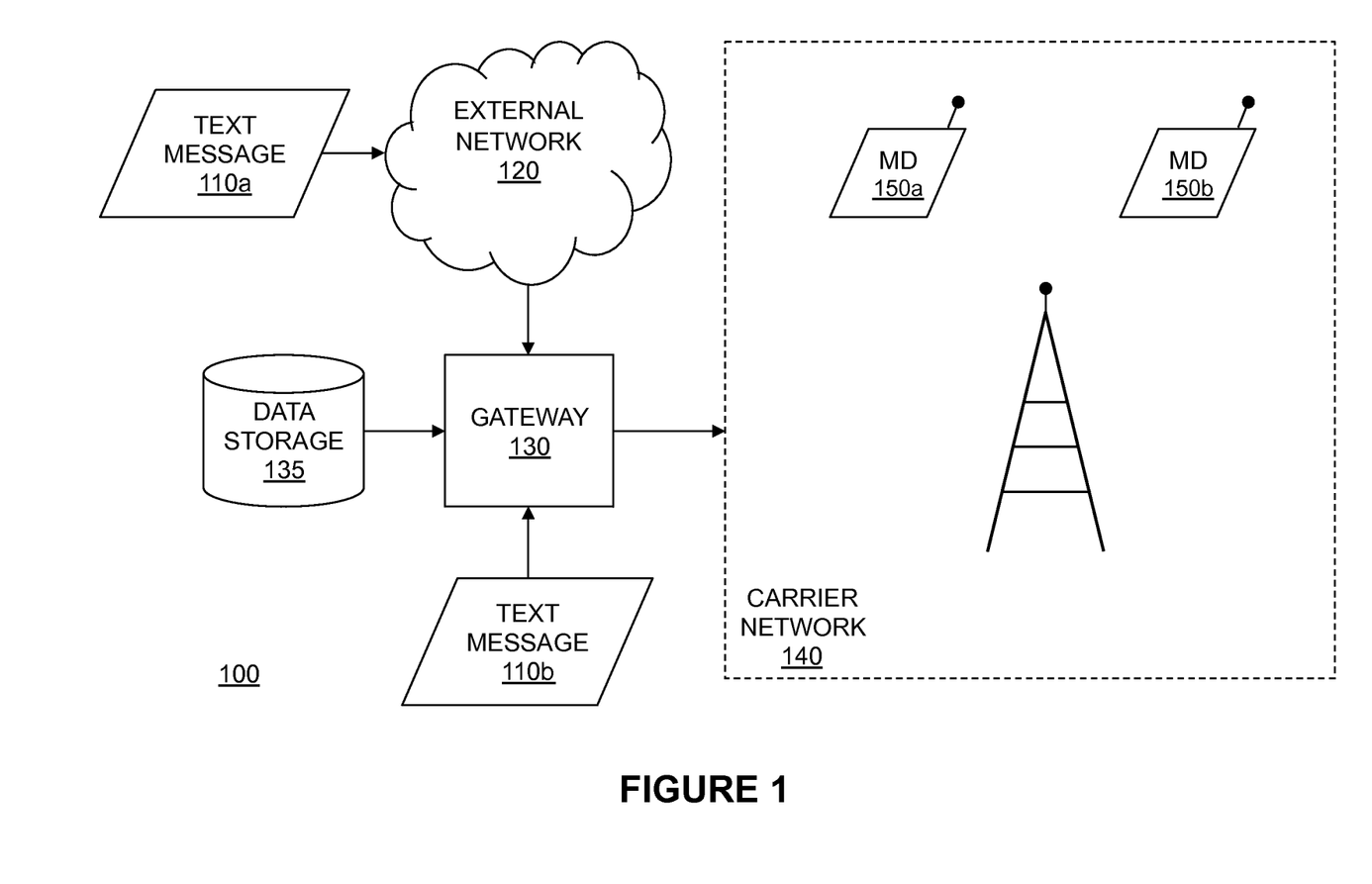
FIG. 1 illustrates a system through which a text message may be sent to a user of a mobile device (e.g., mobile subscriber) according to various implementations of the invention.

Various implementations of the invention, which are now described, replace an original uniform resource locator ("URL") included in a text message (embedded or otherwise) with a replacement URL in order to detect and/or prevent access to unwanted, inappropriate or malicious content. FIG. 1 illustrates a text messaging system 100 in accordance with various implementations of the invention. In some implementations of the invention, text messaging system 100 includes a gateway 130 and a carrier network 140. In some implementations of the invention, carrier network 140 is a wireless carrier network that provides various wireless services to one or more mobile devices 150 (illustrated in FIG. 1 as a mobile device 150a and a mobile device 150b). Carrier network 140 may be a terrestrial cellular network or a satellite network or other carrier network as would be appreciated. Carrier network 140 may provide wireless services including voice services and/or data services, including text messaging services, as would be appreciated.

In some implementations of the invention, gateway 130 provides entry to carrier network 140 from sources external to carrier network 140. Gateway 130 provides a mechanism by which such sources may provide content to mobile devices 150, either directly via multimedia messaging ("MMS") or other IP based messaging technology or indirectly, such as via a URL embedded in a mobile or text message 110 (illustrated as a text message 110a and a text message 110b) or other mechanisms (e.g., URLs embedded as a two dimensional image, a bar code, a Q-code, etc.). In some implementations of the invention, gateway 130 may provide a connection point to carrier network 140 (although other connection points to carrier network 140 may exist). In some implementations, gateway 130 may be operated carrier network 140 or by a third party (as illustrated). In some implementations, gateway 130 may be external to carrier network 140 (as illustrated) or may be internal to carrier network 140 or may be some combination of external and internal components to carrier network 140 as would be appreciated. In some implementations, gateway 130 may include one or more servers (not otherwise illustrated) and related hardware configured to perform various functions as described herein. In some implementations of the invention, some or all of the various functions of gateway 130 may be incorporated into a mobile application operating on mobile device 150 to operate solely with carrier network 140 or in connection with gateway 130.

According to various implementations of the invention, text message 110 may be sent to a user (also referred to herein as a mobile subscriber) of mobile device 150 using SMS. In some implementations of the invention, text message 110 originates from outside carrier network 140. In some implementations of the invention, text message 110 originates from inside carrier network 140. In some implementations of the invention, gateway 130, as a connection point or entry point to carrier network 140 for external sources, intercepts text message 110 destined for mobile device 150. In some implementations of the invention, gateway 130 intercepts text messages 110 internal to carrier network 140 as would be appreciated. In some implementations of the invention, gateway 130 intercepts text messages 110 from sources both external and internal to carrier network 140 as would be appreciated.

Figure 2:
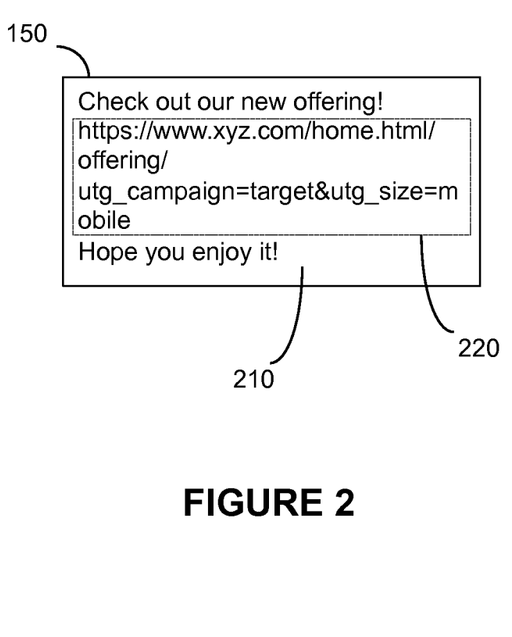
FIG. 2 illustrates a text message with an original URL in a body of a text message according to various implementations of the invention.

FIG. 2 illustrates a text message 110 with a body 210 of the text message and and an original URL 220 embedded within body 210. With SMS, body 210 of text message 110 may include up to 140 characters. As would be appreciated, greater or fewer characters may be included in other text messaging systems or with other messaging protocols.

Figure 3:
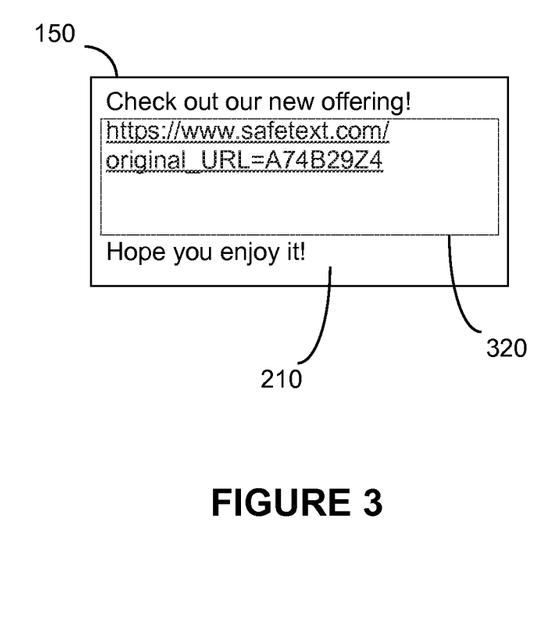
FIG. 3 illustrates a text message with a replacement URL in a body of a text message according to various implementations of the invention.

According to various implementations of the invention, before being transmitted over carrier network 140 to and received by mobile device 150, original URL 220 is replaced in body 210 of text message 110 with a replacement URL 320 as illustrated in FIG. 3. According to various implementations of the invention, replacement URL 320 has a length less than or equal to a length of original URL 220 (i.e., replacement URL 320 has a length not greater than that of original URL 220).

Figure 4:
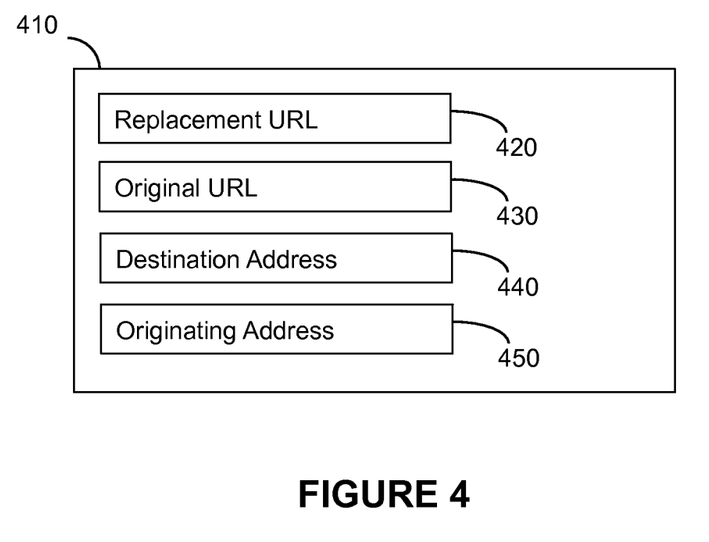
FIG. 4 illustrates a data record which may be used to associate an original URL with a replacement URL according to various implementations of the invention.

In some implementations of the invention, original URL 220 and replacement URL 320 are stored in a data storage 135. For example, gateway 130, upon intercepting text message 110, may create a data record 410 (or other data structure), such as that illustrated in FIG. 4. Data record 410 may be stored in a database in data storage 135. In some implementations of the invention, data record 410 includes a destination URL value 420 and an original URL value 430 to store replacement URL 320 and original URL 220, respectively. In some implementations of the invention, additional information may also be stored in the data record. For example, in some implementations of the invention, a destination address value 440 corresponding to the mobile address or mobile number of mobile device 150 (also referred to as a destination address) to which text message 110 is sent may also be stored in data record 410. In some implementations of the invention, the destination address may be a SIM card number, a mobile device number, a device address, an IP address, an email address, a username, a user account, or other destination address identifying mobile device 110. In some implementations of the invention, an originating address value 450 corresponding to originating address (or other originating number) of a source of text message 110 may be stored. In some implementations of the invention, the originating address may include an originating number, an originating virtual number, an originating IP address or other originating address (e.g., SIM card number, mobile device number, device address, IP address, email address, username, user account or other originating address) as would be appreciated.

In some implementations of the invention, replacement URL 320 points to content (e.g., a web page or other content) other than that of original URL 220. In some implementations of the invention, replacement URL 320 points to content for rendering on mobile device 110. In some implementations, the content informs the user that original URL 220 was generated by a source outside of carrier network 140 or points to other content outside of carrier network 140. In some implementations, the content to which replacement URL 320 points includes user friendly instructions for proceeding (or not) to content linked via original URL 220. In some implementations, the content includes warnings regarding original URL 220.

In some implementations of the invention, the content to which replacement URL 320 points includes a number of user selectable actions (e.g., options, links, etc.) that may be taken by the user. In some implementations, one of the user selectable actions may be to designate and/or report text message 110 (which may include original URL 220) as spam. In some implementations, one of the user selectable actions may be to delete and/or close text message 110. In some implementations, one of the user selectable actions may be to proceed to original URL 220. In some implementations, other user selectable actions may be presented to the user as would be appreciated. In some implementations of the invention, the user's selection is stored and tracked for purposes of analyzing user behavior. In some implementations of the invention, the user's selection is stored and tracked for purposes of identifying certain text messages 110 as spam. In some implementations of the invention, the user's selection is stored (potentially along with other activity) and tracked for purposes of identifying malicious URLs. In some implementations of the invention, the user's selection is stored and aggregated with selections made by other users to characterize URLs (i.e., benign, malicious, etc.).

According to various implementations of the invention, once replacement URL 320 has replaced original URL 220 in body 210 of text message 110, text message 110 is transmitted over carrier network 140 and delivered to/received by mobile device 150. In some implementations of the invention, after text message 110 is received by mobile device 150 and upon the user selecting replacement URL 320 in body 210 of the received text message 110, the content referenced by replacement URL 320 is rendered on mobile device 150. When the user opts to proceed to original URL 220, original URL 220 is retrieved from data storage 135 using replacement URL 320, and the browser of mobile device 150 is redirected to the retrieved original URL.

In some implementations of the invention, after replacement URL 320 is selected by the user, the destination address (i.e., mobile number, etc.) of mobile device 150 associated with replacement URL 320 is retrieved from data storage 135 and compared against an address of the mobile device currently attempting to access replacement URL 320 to confirm that these mobile devices are the same. In some implementations of the invention, if these destination addresses are different (i.e., different mobile devices), access to replacement URL 320 (and hence the original URL) may be denied.

In some implementations of the invention, if original URL 220 is determined to be malicious or include inappropriate content (e.g., adult content not appropriate for minor users, etc.), mobile device 150 may be prevented access to original URL 220 either by blocking original URL 220 from access by mobile device 150, removing original URL 220 from text message 110 and/or from data storage 135, or otherwise preventing mobile device 150 with access to original URL 220.

In some implementations of the invention, original URL 220 may be modified (either before or after storing it in data storage 135), for example, by updating, adding or modifying various name-value pairs within original URL 220 or other modifications. For example, various services are available for tracking user click behavior on the internet. These services typically rely on passing name-value pairs in the URL strings (typically at the end) as would be appreciated. This technique is an important way for advertisers and others to share data and consolidate user activity data at a single collection point. Such modifications are well known, as are the purposes for doing so. However, in the context of text messages, one or more iterations of these modifications (i.e., of modifying original URL 220) on a URL embedded in a conventional text message may result in the URL consuming too many of the allotted 140 characters or being truncated, and hence unable to be resolved. Accordingly, some implementations of the invention, through the use of replacement URL 320, permit original URLs to approach and/or exceed the 140 character limit of conventional text messages and further to dynamically modify the original URL with values observed from the mobile device when it accesses the replacement URL 320 or previously known about the mobile device and stored in the name-value pairs.

Some implementations of the invention scan text message 110 to determine whether text message 110 includes a URL. Some implementations of the invention scan text message 110 for specific syntax beginning with "http://" or "https://". Some implementations of the invention scan text message 110 for custom URL schemes supported by various mobile devices 150. For example, such custom URL schemes may launch a web browser on the device when clicked, or they may launch other applications available on or accessible to mobile device 150. Some implementations of the invention determine whether original URL 220 may be replaced without disrupting such custom URL schemes.

Some implementations of the invention determine whether original URL 220 conforms to a valid URL based on conventional URL syntax requirements. Some implementations of the invention determine whether original URL 220 corresponds to a known malicious site or known malicious scheme. Some implementations of the invention resolve original URL 220 to determine a type and/or nature of the content accessed by original URL 220. Some implementations of the invention resolve original URL 220 to determine whether the content accessed by original URL 220 is appropriate for minors or other types of users of mobile device 150.

In some implementations of the invention, original URL 220 is evaluated to determine whether to permit access to original URL 220, to automatically prevent access to original URL 220 (e.g., in the event of known malicious content, etc.), or to prevent access to original URL 220 in some circumstances (e.g., prevent access by minors to adult content, etc.).

In some implementations of the invention, in addition to replacing original URL 220 with replacement URL 320 in text message 110, the originating address may also be replaced with a replacement originating address or code to obscure the originating address from the user of mobile device 150. In these implementations of the invention, mobile device 150 may be prevented from responding directly to the source of text message 110, thereby inadvertently revealing their identity to the source.

Figure 5:
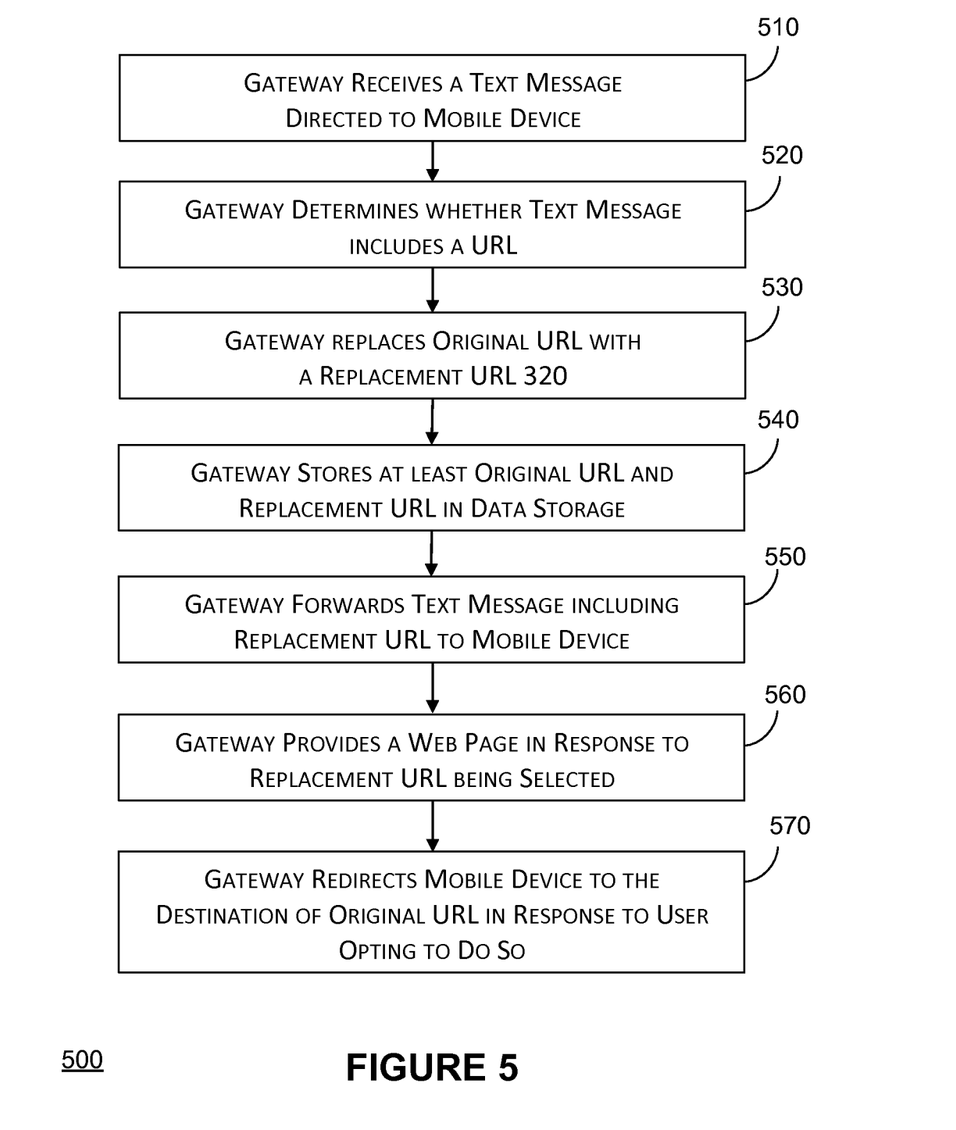
FIG. 5 illustrates a process for replacing an original URL included in a body of a text message with a replacement URL according to various implementations of the invention.

FIG. 5 illustrates a process 500 for handling text messages with embedded URLs according to various implementations of the invention. In an operation 510, gateway 130 receives a text message 110 addressed or otherwise directed to mobile device 150. In an operation 520, gateway 130 scans text message 110 to determine whether body 210 includes original URL 220. If so, in an operation 530, gateway 130 replaces original URL 220 with replacement URL 320. In an operation 540, gateway 130 stores at least original URL 220 and replacement URL 320 in data storage 135. In an operation 550, gateway 130 forwards text message 110 including replacement URL 320 to mobile device 150.

In an operation 560, after a user of mobile device 150 selects replacement URL 320 (and a browser operating on mobile device 150 renders that replacement URL), gateway 130 provides a content (e.g., a web page) that may be rendered on mobile device 150 thereby presenting the user of mobile device 150 with a number of user selectable actions. In an operation 570, after the user of mobile device 150 selects an option to proceed to the destination (e.g., web page) of original URL 220, gateway 130 redirects mobile device 150 (in some implementations, its browser) to the destination via original URL 220.

While various implementations of the invention are described above with regard to text messages, the invention may also be applied to various mobile messages including, but not limited to SMS, MMS, IM, chat, social network posts/messages and other mobile messages.

While various implementations of the invention are described above with regard to a carrier network, the invention may also be applied to various mobile messages delivered by private messaging communities and accessed via external Gateway or API.

While various implementations of the invention are described above with regard to URLs embedded in text messages, the invention may also be applied to two dimensional bar codes, QR-codes, or other similar image codes that may be captured or scanned by mobile device 150. Any of these image codes may be replaced with a corresponding replacement URL to provide similar functionality to that described above with regard to embedded URLs as would be appreciated.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for handling mobile messages in a messaging service hosted by a carrier network, the method comprising:
   intercepting, at a connection point to the carrier network, a mobile message addressed to a mobile device of a subscriber to the carrier network, wherein the mobile message originates outside the carrier network, and wherein the mobile message enters the carrier network through the connection point;
   determining whether the mobile message includes a uniform resource locator;
   replacing the uniform resource locator with a replacement uniform resource locator when the mobile message includes the uniform resource locator;
   storing the uniform resource locator together with: its associated replacement uniform resource locator and the connection point through which the mobile message entered the carrier network; and
   forwarding the mobile message with the replacement uniform resource locator to the mobile device of the subscriber.

2. The method of claim 1, further comprising:
  receiving a request for a content referenced by the replacement uniform resource locator from the mobile device of the subscriber; and
  serving the content referenced by the replacement uniform resource locator to the mobile device.

3. The method of claim 2, wherein serving the content referenced by the replacement uniform resource locator to the mobile device comprises serving the content including a plurality of subscriber selectable options to the mobile device, wherein the plurality of subscriber selectable options includes at least one of the following subscriber selectable options: report the mobile message as spam, cancel access to the uniform resource locator, or proceed to the location specified by the uniform resource locator.

4. The method of claim 3, wherein when the subscriber elects to proceed to the location specified by the uniform resource locator, automatically redirecting the mobile device to the uniform resource locator.

5. The method of claim 3, further comprising:
  receiving a selected one of the plurality of subscriber selectable options from each of a plurality of subscribers;
  aggregating the selected ones of the plurality of subscriber selectable options from each of the plurality of subscribers; and
  characterizing the original URL based on the aggregated selected ones of the plurality of subscriber selectable options from each of the plurality of subscribers.

6. The method of claim 2, wherein the content is a web page.

7. The method of claim 2, wherein serving the content referenced by the replacement uniform resource locator to the mobile device comprises:
  preventing access, by the mobile device, to the stored uniform resource locator associated with the replacement uniform resource locator.

8. The method of claim 2, wherein serving the content referenced by the replacement uniform resource locator to the mobile device comprises:
  retrieving the stored uniform resource locator associated with the replacement uniform resource locator; and
  redirecting the request from the mobile device of the subscriber to content referenced by the stored uniform resource locator.

9. The method of claim 8, wherein redirecting the request from the mobile device of the subscriber to a web page referenced by the stored uniform resource locator comprises:
  modifying the stored uniform resource locator by updating at least one name-value pair associated with the stored uniform resource locator; and
  redirecting the request from the mobile device to content referenced by the modified uniform resource locator.

10. The method of claim 1, wherein intercepting, at a connection point to the carrier network, a mobile message addressed to a mobile device of a subscriber to the carrier network comprises intercepting, at a gateway server to the carrier network, the mobile message addressed to the mobile device of the subscriber to the carrier network.

11. The method of claim 1, wherein replacing the uniform resource locator with a replacement uniform resource locator comprises:
  generating the replacement uniform resource locator.

12. The method of claim 1, wherein replacing the uniform resource locator with a replacement uniform resource locator comprises:
  replacing the uniform resource locator with a replacement uniform resource locator configured to direct the mobile device to content other than content associated with the uniform resource locator.

13. The method of claim 1, wherein storing an originating address of the mobile message comprises storing a SIM card number, a mobile device number, a device address, an IP address, an email address, a username, a user account of the mobile message.

14. The method of claim 1, wherein storing the uniform resource locator and its associated replacement uniform resource locator comprises:
  storing a destination number of the mobile device to which the mobile message is addressed.

15. The method of claim 1, further comprising:
  evaluating the uniform resource locator to determine whether to: permit access, by the mobile device, to the uniform resource locator; prevent access, by the mobile device, to the uniform resource locator; or prevent access, by the mobile device, to the uniform resource locator in some circumstances.

16. The method of claim 1, wherein a length of the replacement uniform resource locator is not longer than a length of the uniform resource locator.

17. The method of claim 1, wherein replacing the uniform resource locator with a replacement uniform resource locator comprises:
  replacing the uniform resource locator with a replacement uniform resource locator configured to direct a mobile browser operating on the mobile device to content other than content associated with the uniform resource locator.

* * * * *